United States Patent [19]

Wiseman

[11] Patent Number: 5,048,805

[45] Date of Patent: Sep. 17, 1991

[54] CLAMP

[75] Inventor: Michael D. Wiseman, Cypress, Tex.

[73] Assignee: Avtool, Inc., Lake Charles, La.

[21] Appl. No.: 558,626

[22] Filed: Jul. 27, 1990

[51] Int. Cl.$^5$ .............................................. B23P 15/26

[52] U.S. Cl. .................................................. 269/48.4

[58] Field of Search .................... 269/48.2, 48.3, 48.4, 269/49; 29/720, 721, 525.1, 525.2

[56] References Cited

U.S. PATENT DOCUMENTS

| | | |
|---|---|---|
| 2,188,450 | 1/1940 | Verdon-Roe . |
| 2,271,012 | 1/1942 | Hutchins . |
| 2,321,518 | 6/1943 | Rossmann . |
| 2,365,787 | 12/1944 | Wallace . |
| 2,424,309 | 7/1947 | Elvy . |
| 2,463,731 | 3/1949 | Whalen . |
| 2,775,155 | 12/1956 | Tompkins et al. . |
| 3,096,679 | 7/1963 | Jones . |
| 3,196,734 | 7/1965 | Finkle . |
| 3,414,253 | 12/1968 | Mewse . |
| 3,424,050 | 1/1969 | Burrow et al. . |
| 3,568,562 | 3/1971 | Harwood .......................... 269/48.3 |
| 4,892,449 | 1/1990 | Croxton ............................ 269/48.3 |

*Primary Examiner*—Robert C. Watson
*Attorney, Agent, or Firm*—Fitch, Even, Tabin & Flannery

[57] ABSTRACT

A clamp assembly for fastening and holding workpieces has a mandrel with flexible retaining fingers that are normally extended at a reference position for ease of insertion and removal from the workpiece, which assembly is secured to the workpiece by withdrawal of a spindle shaft coupled to the extending fingers to radially expand the fingers over a spreader bar. The spindle shaft and flexible fingers are maintained in the retracted and workpiece-securing position until rotation of an end cap disengages the secured retaining tabs from the spindle shaft and aligns them with planar surfaces for clamp recovery to the reference position by a biasing means.

22 Claims, 2 Drawing Sheets

CLAMP

BACKGROUND OF THE INVENTION

The present invention relates to a clamping device and more particularly, a clamping device for holding workpieces.

Sheet clamps or expandable-mandrel-type devices are utilized for temporarily holding sheets of material together, such as metal panels joined by riveting. These clamping devices have found particular application in the aircraft industry, where overlapping skin panels are temporarily secured together to maintain them in a rivet-hole-aligned position prior to riveting. The clamps frequently include elongated, slidable, needle-like structures with enlarged heads, which are introduced through a pair of aligned rivet holes. The sheets are secured by forced separation of the enlarged heads.

Clamping action for many of the clamping devices is achieved by pulling the needles toward the clamp body over a spreader bar, which causes transverse separation of the needle ends. Some of these clamp-like devices utilize a spring-biased action with the needle structures normally withdrawn into a clamp body, and the enlarged heads are in proximity to the clamp body leading end for subsequent extension and insertion into the sheet materials. The clamps are operable by extending the needles over and beyond a spreader bar, which allows the flexible head ends to be moved toward each other for insertion into aligned rivet holes. The clamp body is subsequently brought into proximity to the workpiece surface, either by the operator or by reaction to the spring pulling the needle members into the clamp body during needle member withdrawal through the clamp body. The spreader bar forces the needle ends to move apart to engage the inner panel, inner surface, thus securing the workpieces between the clamp body and the enlarged ends of the needles. Indicative of this normally-secured biasing action are the clamping devices shown in U.S. Pat. Nos. 2,188,450; 2,271,012; 2,365,787; 2,463,731; and 3,196,734. These clamps thus require a mechanical force to extend the needle members for insertion into the aligned holes of the sheets to be joined, and subsequent release of the moving mechanical force withdraws and expands the needle heads to contact the underlying workpiece inner surface and retain the workpieces between the expanded head ends and the clamp body. However, the maximum clamping force which the clamps exert is in some cases limited by the spring force, that is the product of the spring constant and the spring displacement. This spring force may not be adequate to clamp the two sheets together. The mechanical force to extend the needle members may be manually applied either by hand or with a tool to overcome a larger clamp bias force.

Other clamping or fastening devices utilize a mechanical operator to both engage and disengage the enlarged ends of needle-like clamps. These clamping devices with mechanical operators may utilize hydraulic fluids rather than a spring biasing force.

SUMMARY OF THE INVENTION

The present invention provides a clamp assembly with a mandrel to engage workpieces, such as overlapping skin-like layers, for temporary retention of these layers in a specific alignment or position for subsequent operations, including machining, permanent clamping or securing. The temporary clamp or mandrel apparatus is removable from the workpiece and reusable.

The present clamping apparatus utilizes an expandable mandrel, which has elongated flexible fingers with ears or protuberances at the ends of the flexible fingers. The mandrel is normally-biased with the flexible fingers extended for ready insertion into and engagement with overlapped workpieces. After the mandrel ears have been inserted in aligned workpieces, a spindle shaft coupled to the flexible fingers is withdrawn from the trailing end of the clamp body against a biasing force. The expandable, needle-like flexible fingers are moved over a spreader bar for engagement of the workpiece by the mandrel ears to maintain the workpiece between the clamp body and the mandrel ears. The shaft extends through an end-cap on the clamp body, which may be rotated to move a lock nut or other locking device to disengage and release the shaft from the workpiece securing position. Rotation of the end-cap and release of the shaft allows the biasing means to extend the expandable fingers past the spreader bar for disengagement of the flexible-finger ears from proximity to the workpiece. A cushion is mounted at the clamp-body leading end, which is in proximity to the workpiece, to contact and prevent scratching or abrading of the workpiece surface.

BRIEF DESCRIPTION OF THE DRAWINGS

In the Figures of the drawing, like reference numerals identify like components, and in the drawings.

DETAILED DESCRIPTION OF THE PREFERRED EMBODIMENT

Figure 1:
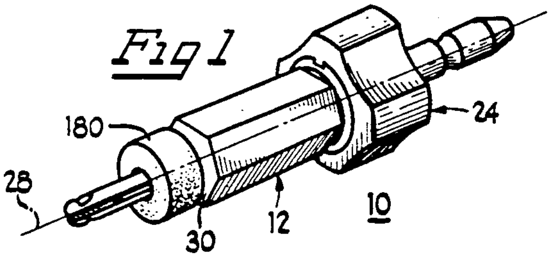
FIG. 1 is a perspective view of a preferred embodiment of the clamp device.
Figure 2:
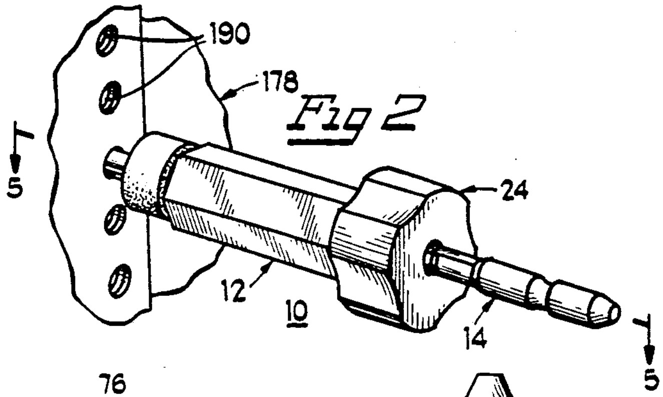
FIG. 2 is a perspective view of the clamping device of FIG. 1 with the mandrel extended into overlapped sheets prior to securing the clamp.
Figure 3:
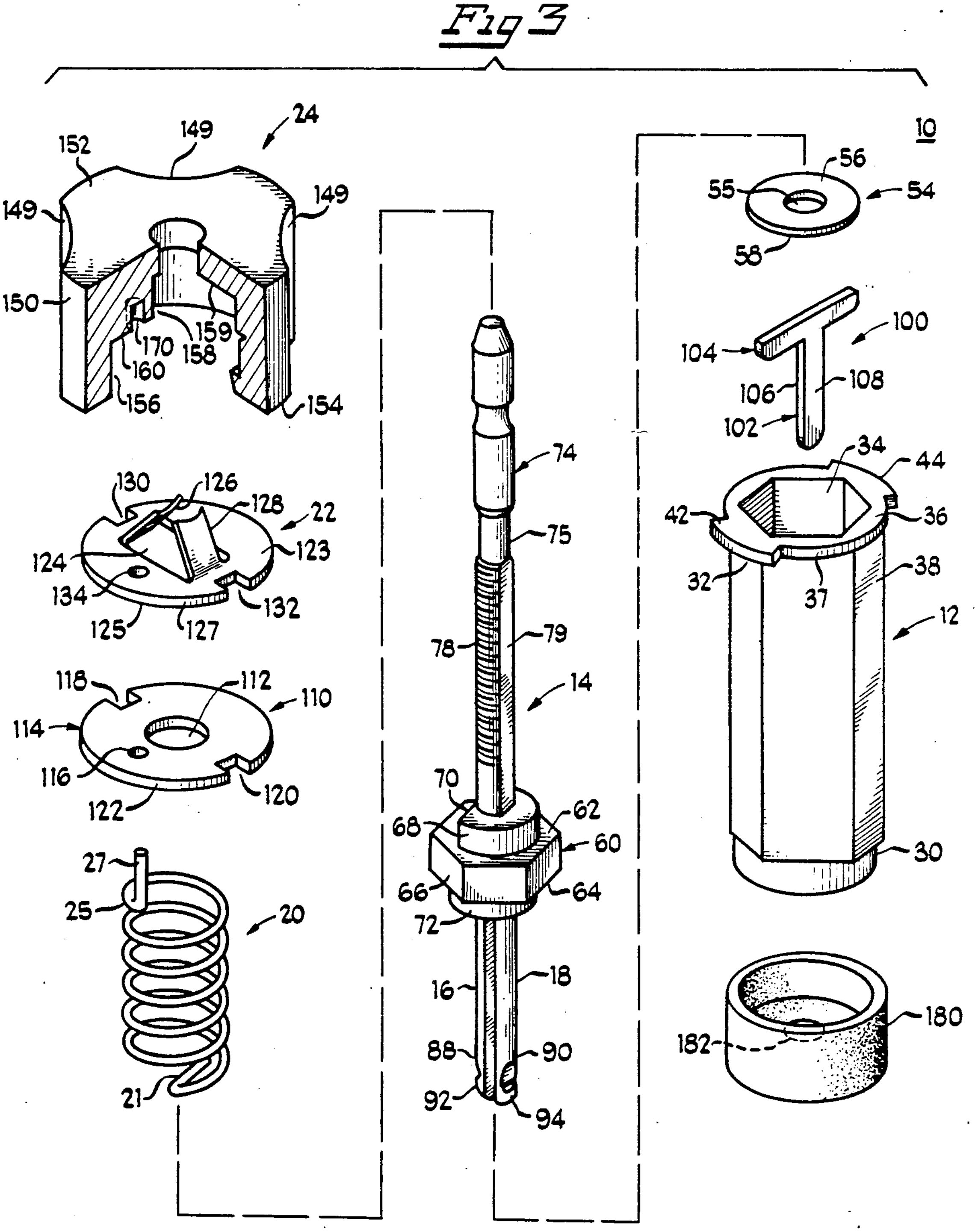
FIG. 3 is an enlarged exploded view of the assembly of FIG. 1.

The present invention provides a normally-biased-open, expandable-mandrel clamp device with a spindle shaft that may be withdrawn from a clamp body to cause engagement of expandable flexible fingers with the workpiece. In FIGS. 1-3, a preferred embodiment of a fastening and clamping device 10 includes a body or housing 12. A mandrel member 14 has first and second needle-like fingers 16 and 18 extending through housing 12 and end-cap 24. Locking device 22 is rotatable by end-cap 24 and operable to retain mandrel 14 and fingers 16, 18 against coil spring 20.

Figure 7:
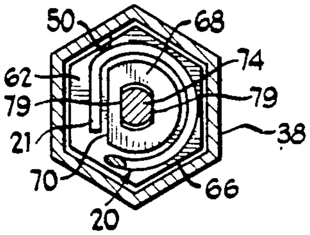
FIG. 7 is a cross-sectional plan view of the spindle shaft base taken along the line 7—7 of FIG. 4.

Housing 12 enclosing spring 20 and mandrel 14 has a hexagonally-shaped cross-section with a longitudinal axis 28, a first or sealed end 30 and a second or open end 32. In FIGS. 3 and 7, housing chamber 26 has a hexagonally-shaped inner surface 48 with a plurality of angled surfaces 50 and well 53 with a narrower diameter than chamber 26 at lower or sealed end 30. Inner surface 48 may have only one flat or angled surface along the housing inner length, for example, or other shapes and means to prevent rotation of mandrel 14. Sealed end 30 has an aperture 46 located along axis 28, and sloped shoulder 52 extends between inner surface 48 and well 53. The hexagonal cross section of housing 12 and chamber 26 is merely exemplary and not a limitation.

Mandrel 14 with fingers 16, 18 is operable between an open or reference position and a securing or clamping position. Base 60 of mandrel 14 has a first or upper face 62 and a second or lower face 64 in the vertical orientation of FIGS. 3–5. Collar-like base 60 has angled surfaces or flats 66 juxtaposed with the corresponding flats or angle surfaces 50 of housing inner surface 48 to inhibit rotation of mandrel 14 in housing 12. Base upper pedestal 68 is approximately cylindrical with a flat face or surface 70 along a chord of the cylinder surface, and upwardly projects from base upper face 62 generally along axis 28. Lower pedestal 72 extends from lower collar surface 64 along axis 28. At the reference position pedestal 72 contacts upper surface 56 of retainer washer 54 with flexible fingers 16 and 18 extended from sealed end 30, as shown in FIG. 4.

Spindle shaft 74 of mandrel 14 with first diameter 76 extends from upper pedestal 68 generally along axis 28 and has screw-like threads 78 along shaft body 75. At least one flat or planar surface 79 is provided along the spindle shaft longitudinal surface, which flat is about parallel to axis 28 and intersects threads 78. The cross-sectional diameter of shaft 74 at threads 78 is greater than its cross-sectional diameter at flats 79, which permits release of clamp 10 from the securing position, as noted below.

Figure 4:
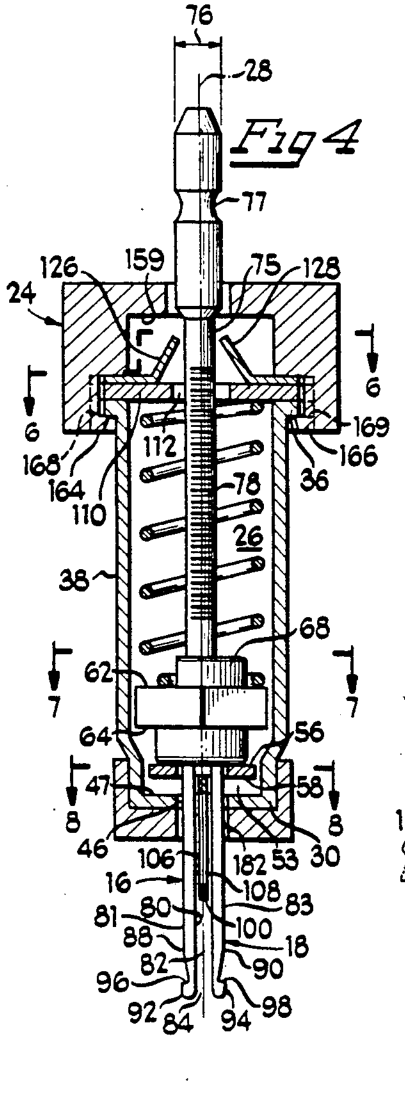
FIG. 4 is a cross-sectional view of a preferred embodiment of the clamp with the mandrel normally-extended.
Figure 5:
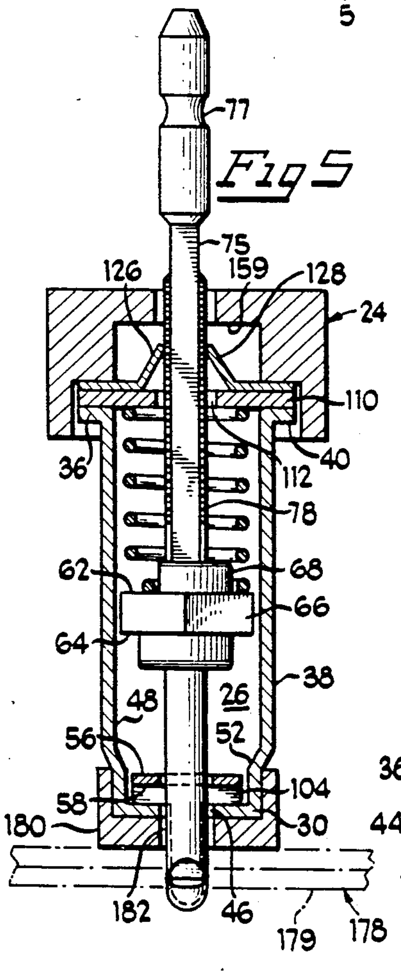
FIG. 5 is a cross-sectional elevational view taken along line 5—5 of FIG. 2 of the preferred embodiment of the clamping device in a clamping position securing two workpieces together.
Figure 8:
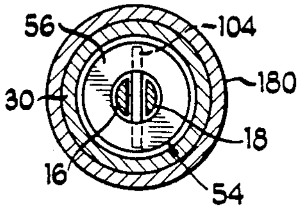
FIG. 8 is a cross-sectional plan view of the retaining washer and spreader bar taken along the line 8—8 of FIG. 4; and, FIG. 9 is a plan view in section, having portions broken away, of the end-cap of FIG. 1 rotated to engage the spindle shaft threads.

First and second flexible fingers 16 and 18 in FIGS. 3–5 are expandable to clamp workpieces 178 together. Fingers 16, 18 extend from lower pedestal 72 of support base 60 through sealed-end aperture 46 and retainer-washer central passage 55, and are operable over or spread apart by spreader 100 in slot or gap 84. Slot 84 is provided between inner edges 80 and 82 of fingers 16, 18. Projecting ends 88 and 90 of fingers 16 and 18 have radially extending and workpiece-contacting ears or protuberances 92 and 94, respectively, with shoulders 96 and 98 between ears 92, 94 and finger outer edges 81 and 83.

Spreader member 100 for expanding fingers 16, 18 to the securing position has a generally T-shape with a leg 102 and a perpendicular crossbar 104. This spreader shape is merely exemplary and not a limitation. Leg 102 has smooth or flat parallel surfaces 106 and 108, and protrudes through aperture 46 of sealed end 30. Crossbar 104 rests on inner surface 47 of sealed end 30 with retainer washer 54 mounted in well 53 above and secured against crossbar 104 to maintain spreader 100 at sealed end 30. Spreader leg 102 and crossbar 104 are longitudinally aligned along axis 28, with leg 102 protruding into finger slot 84 with finger inner edges 80 and 82 juxtaposed along surfaces 106, 108, respectively. In FIG. 4 at the released position, lower pedestal 72 contacts upper surface 56 of retainer washer 54 and flexible fingers 16, 18 are extended along axis 28, with ears 92, 94 protruding and freely movable beyond leg 102. During withdrawal of mandrel 14 and base 60 toward housing opening 34, ears 92, 94 approach spreader leg 102, radially expand and are more rigidly biased outwardly from axis 28.

Support washer 110 in FIGS. 4 and 5 has a generally annular shape with aperture 112 and through port 116 in body 114 and is positioned on open end 32 to seal chamber 26 and retain mandrel 14 and spring 20 in housing. In FIG. 3, diametrically opposed washer first groove 118 and second groove 120 are provided at circumference 122 of annular body 114 to receive mating end-cap lugs 164, 166 for rotation therewith.

Figure 6:
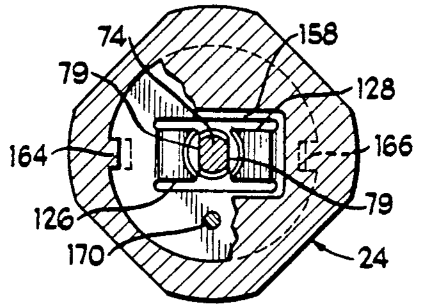
FIG. 6 is a cross-sectional plan view of the lock nut taken along line 6—6 of FIG. 4.
Figure 9:
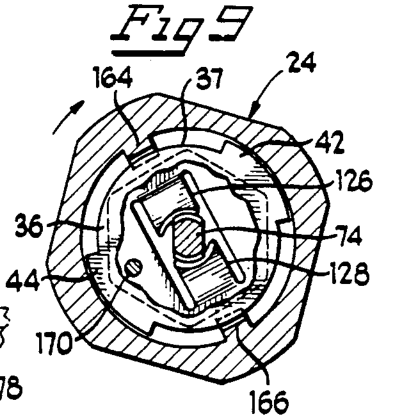

Locking device 22 for retaining mandrel 14 at a securing position is illustrated as a one-way nut or annular disk in FIGS. 3, 6 and 9. Locking device 22 has a slotted central aperture 124, an upper surface 123, a lower surface 125, and circumference 127. First tab 126 and second tab 128, which are engageable with threads 78 to retain mandrel 14 at the securing position, are angularly displaced from disk 121 and upwardly converge toward axis 28. Diametrically opposed first notch 130 and second notch 132 at annular-disk circumference 127 are alignable with first and second support-washer grooves 118, 120, respectively, for engagement of end-cap lugs 164, 166 and simultaneous rotation with end-cap 24. Support-washer through-port 116 and locking device portal 134 are also alignable to receive projecting spring arm 27, which arm is rotatable with washer 110 and locking device 22 to torsionally displace biasing spring 20. Shaft 74 extends and is axially movable through locking device aperture 124 and support washer passage 112.

Flange 36 at housing open end 32 has a generally annular shape and radially extends outward from housing surface 38 to form lip 40. Flange 36 has first sill or protuberance 42 and second sill or protuberance 44 radially protruding from flange edge 37. End-cap 24, which is mounted on open end 32 and flange 36, is rotatable to move tabs 126, 128 and disengage threads 78 for the release of mandrel 14 from the securing position. Generally cylindrical end-cap 24 has a top end 152 and a bottom end 154, but is shown in the Figures with a plurality of vertical depressions 149 extending along its sidewall 150 for ease of gripping. A first recess 156 with inner base 160 is open at end-cap bottom end 154. A second, rectangular recess 158 in base 160, which has a lower inner wall 159, is matable with tabs 126, 128. End cap aperture 162 for shaft 74 communicates between top end 152 and recesses 156, 158. End-cap first and second lugs 164, 166 (cf. FIGS. 4 and 6) with shoulders 168, 169, extend into first recess 156 and engage support-washer first and second grooves 118, 120 and lock-nut first and second notches 130, 132 respectively, to assure simultaneous and equiangular rotation of washer 110 and lock-nut 22. Protuberance shoulders 168, 169, which fit over edge 37, engage lip 40 and secure end-cap 24 on open end 32. Shoulders 168, 169 also limit end-cap 24 rotational movement between flange first and second sills 42, 44 to approximately 90° by contact with end-cap projections or lugs 164, 166.

Spring 20 biases mandrel 14 to extend flexible fingers 16, 18 at the reference position and is positioned around spindle shaft 74 in chamber 26. Coil spring lower formed end 21 is generally aligned with upper pedestal surface 70, contacts collar upper surface 62, and is generally wrapped about upper pedestal 68 to secure it at lower formed end 21. Vertically projecting arm 27 at coil spring upper end 25, which is generally about parallel to axis 28, extends through washer port 116, portal 134, and is anchored in blindhole passage 170 of end-cap 24. Thus, coil spring 20 is secured in chamber 26 between support washer 110 and support base 60 to bias mandrel 14 and, first and second flexible fingers 16, 18 to extend from body 12.

In the reference position, shaft 74 has threads 76 aligned with tabs 126, 128 and extends through aligned support-washer aperture 112, passage 124 of one-way nut 22, and end-cap passage 162. Base 60 contacts retainer washer 54, and flexible fingers 16, 18 are extended beyond the end of spreader leg 102 for resilient movement and removal or insertion into a workpiece. Housing flange 36, one-way nut 22 and support washer 110 are positioned in recess 156 of end-cap 24 with shaft-thread-aligned tabs 126 and 128 of one-way lock-nut 22 in register with second recess 158. Axial movement and withdrawal of shaft 74 from chamber 26 along axis 28 will move flexible fingers 16, 18 toward sealed end 30 while spreader bar 100 expands fingers 16, 18 outwardly normal to axis 28 to contact the underside of workpiece 178 and secure it to housing sealed end 30. Workpiece 178 which is secured by clamp 10 in FIGS. 2 and 5 is illustrated as overlapping metal panels with holes or ports 190 in an aligned position. Axial withdrawal of shaft 74 with tabs 126, 128 in contact with threads 78 automatically locks or secures shaft 74 and fingers 16, 18 at a secured position. In addition, spring 20 surrounding shaft 74 is compressed to provide a biasing force in a direction to restore mandrel 14 to the reference position.

As noted above, first and second notches 164, 166 of of end-cap 24 engage first and second notches 130, 132 of one-way nut 22 and grooves 118, 120 of support washer 110 to simultaneously rotate nut 22 and washer 110 with end-cap 24. Therefore, rotation of end-cap 24 and nut 22 about 90° will disengage tabs 126, 128 from threads 78 and align them with flats 79, which allows compressed spring 20 to move flexible fingers 16, 18 and shaft 74 to the reference and unsecuring position, as noted in FIG. 4. Fingers 16, 18 and clamping device 10 are then removable from the workpiece 178 and clamp 10 may be reused to secure another workpiece. Rotation of end-cap 24 also induces a torsional load in spring 20 as projecting arm 27 is secured in end-cap passage 170 but is anchored against rotation in chamber 26 by arm end 21 formed about pedestal 68 at base surface 70. The spring torsional load at rotation of end-cap 24 acts as a restoring force to return end-cap 24 and lock nut 22 to the reference position with tabs 126, 128 aligned with mandrel threads 78.

In the preferred embodiment, bushing 180 (cf. FIGS. 4 and 5) with a central port, which bushing may be rubber, is mounted on sealed end 30 of housing 12 with flexible fingers 16 and 18 extending therethrough. Rubber bushing 180 provides a cushion between the workpiece and body 12 for drawing workpiece 178 to the clamp device 10, as tightly as desired by the operator without damage to the surface of workpiece 178. Further, cushion 180 operates similarly to a linear-rate spring when tightening clamp 10 and Workpiece 178, as well as inhibiting scratching or gouging of the workpiece surface. Cushion 180 may be of any material to provide a cushioning effect and may be secured on sealed end 30 by means known in the art, including adhesives and friction fit.

Mandrel 14 can be moved from its reference insertion position to its securing position (FIG.5) by a tool (not shown) which can be manually, pneumatically or hydraulically operated, and which bears against the top 152 of end-cap 24. The tool, as an example, may have a mechanism which locks onto the spindle shaft 74 at an annular groove 77 at end-cap 24.

While only a specific embodiment of the invention has been described and shown, it is apparent that various alterations and modifications can be made therein. It is, therefore, the intention in the appended claims to cover all such alterations and modifications as may fall within the scope and spirit of the invention.

What is claimed is:

1. A fastening apparatus for temporarily clamping and holding workpieces, said apparatus comprising:
- a housing defining a chamber and having an open end, and a sealed end with an aperture;
- a spreader bar having a leg, said bar mounted in said chamber with said leg extending through said sealed end aperture;
- means for retaining said spreader bar in said chamber;
- a mandrel having a longitudinal axis and a base,
- a spindle shaft extending through said open end from said base along said axis, and
- at least two flexible fingers extending from said base along said longitudinal axis in an opposed direction to said spindle shaft with said spreader-bar leg between said fingers,
- said shaft operable to move said base and flexible fingers to a securing position with said workpiece secured at said housing sealed end;
- means for biasing said mandrel to a reference position with said base in proximity to said means for retaining, and said flexible fingers extended beyond said spreader bar leg; and,
- an end-cap sealingly mounted over said open end and said means for locking, said end-cap rotatable to move said locking means to release said shaft and workpieces and return said mandrel to said reference position.

2. A fastening apparatus as claimed in claim 1 wherein each of said fingers has a projecting end for engaging and retaining said workpiece, which projecting ends extend beyond said spreader bar leg at said reference position and are radially expandable by said spreader bar at said securing position.

3. A fastening apparatus as claimed in claim 1 wherein said housing has an inner surface with at least one angular face on said inner surface;
- said mandrel base having a collar with at least one angular surface;
- said collar angular surface engageable with said inner surface angular face to retain said mandrel against rotation in said chamber.

4. A fastening apparatus as claimed in claim 1 wherein said spindle shaft has an outer surface with threads thereon, and a first cross-sectional diameter;
- said spindle shaft defining at least one planar surface on said shaft outer surface along the length of the shaft outer surface and generally parallel to said longitudinal axis, wherein said shaft cross-sectional diameter at said planar surface is smaller than said first cross-sectional diameter at said threads for release and return of said mandrel to said reference position from a securing position.

5. A fastening apparatus as claimed in claim 4 wherein said shaft has a first planar surface and a second planar surface, which first and second planar surfaces are parallel and extend along the shaft length on chords of said shaft diameter.

6. A fastening apparatus as claimed in claim 4 wherein said locking means is a one-way nut engageable with said spindle shaft threads to retain said shaft in said securing position.

7. A fastening apparatus as claimed in claim 4 wherein said locking means is a one-way nut having a central port with said spindle shaft extending therethrough, and at least one tab angularly extending into said central port, which one-way nut and tab are rotatable to engage said shaft threads to retain said shaft in said securing position.

8. A fastening apparatus as claimed in claim 5 wherein said end cap has a body with an outer and first diameter, said body defining an enclosure with a first recess having a second diameter, a generally rectangular second recess in said enclosure with a lengthwise dimension less than said first diameter, said first recess and second recess defining a first end cap shoulder therebetween;

said end cap body having a first end and a second end, said first recess open at said end cap first end, which body has at least one end-cap projection protruding in said first recess at said end cap first end;

said housing having an outer surface and defining a second generally annular lip on said outer surface at said housing open end, which end cap first lip and housing second lip are engageable to maintain said end cap on said housing open end.

9. A fastening apparatus as claimed in claim 8 wherein said locking means is a one-way nut having a central port with said spindle shaft extending therethrough;

said one-way nut having at least one tab angularly extending into said central port;

said tabs positioned in said end cap second recess and aligned with said shaft threads at said reference and securing positions, which end cap is operable to rotate said one-way nut to align said tabs with shaft planar surfaces for mandrel release from said securing position and return to said reference position by said bias means.

10. A fastening apparatus as claimed in claim 1 further comprising a means for cushioning, said cushioning means mounted on said housing sealed end and having a central passage with said flexible fingers extending therethrough, said cushioning means operable to contact and cushion said workpiece in said securing position.

11. A fastening apparatus for temporarily clamping and holding workpieces, said apparatus comprising:

a housing with a chamber, an open end and a sealed end having an aperture;

a mandrel with a base and a longitudinal axis, said mandrel having a spindle shaft longitudinally extending from said base and flexible fingers extending from said base in an opposed direction to said shaft, which fingers and shaft protrude from said chamber;

a locking means and a support washer mounted on said housing at said open end;

an end cap secured to and rotatable about said open end and enveloping said locking means and support washer;

a spreader bar having a leg, said spreader bar mounted in said chamber and said leg extending from said aperture between said flexible fingers;

a bias means positioned in said chamber between said support washer and said base, and biasing said flexible fingers to extend over said spreader bar and beyond said spreader-bar leg for insertion into a workpiece at a reference position;

said shaft axially operable to move said mandrel and fingers along said axis for retention by said locking means at a workpiece securing position.

12. A fastening apparatus for temporarily clamping and holding workpieces, said apparatus comprising:

a housing defining a chamber, an open end and a sealed end, which sealed end has an aperture;

a mandrel positioned in said chamber and having a spindle shaft, a longitudinal axis and at least two flexible fingers with workpiece-engaging ends, which flexible fingers are insertable into a workpiece for securing against said sealed end;

a spreader bar having an extending leg, which spreader bar is mounted at said housing sealed end with said leg extending through said aperture and between said flexible fingers;

means for locking said mandrel in a workpiece-securing position, said locking means positioned at said housing open end and operable to contact said shaft to retain said mandrel at a securing position;

means for biasing operable to move said mandrel to said sealed end at a reference position with said workpiece-engaging ends resiliently extending beyond said leg; and, an end cap mounted on said housing open end having a passage and at least one lug to engage said locking means for rotation with said end cap;

said spindle shaft extending through said end-cap passage and operable along said axis to move said mandrel and said flexible fingers in a workpiece to rigidly, radially expand said workpiece-engaging ends to contact said workpiece and secure it against said housing sealed end by said locking means engagement with said shaft.

13. A fastening apparatus as claimed in claim 12 further comprising a support washer with a central port and at least one notch at its perimeter, said support washer mounted on said housing open end and having said locking means mounted thereon with said spindle shaft extending through said central port.

14. A fastening apparatus for temporarily clamping and holding workpieces as claimed in claim 13 wherein said locking means defines a central passage, at least one locking means notch alignable with said support central tab extending into said central passage;

said spindle shaft having an outer surface, threads along said outer surface and at least one planar surface along said shaft, said spindle shaft extending through said locking means central passage;

said end cap lugs engaging said locking means notch and support washer notch and operable to rotate said locking means tabs to said planar surface to release said shaft and said mandrel from said workpiece-securing position.

15. A fastening apparatus as claimed in claim 14 wherein said flexible fingers have an outer edge and each of said workpiece-engaging ends has a projecting ear, which ear and finger outer edge define a shoulder therebetween to contact said workpiece and secure it against said housing sealed end.

16. A fastening apparatus as claimed in claim 15 wherein said mandrel has a support base with an upper pedestal and a lower pedestal;

said bias means is a coil spring with an upper end and a lower end, said spring lower end having a formed end to contact and clasp said upper pedestal, said upper end having an arm extending generally parallel to said longitudinal axis;

said support washer having a port, said locking means having an opening and said end cap defining a blindhole bore, which port, opening and blindhole bore are aligned at said reference position;

said coil spring positioned in said housing surrounding said shaft with said vertically extending arm extending through said aligned support washer port, locking means opening and end-cap, blindhole bore, and operable between said mandrel base and said support washer to bias said flexible fingers to protrude beyond said leg and said tabs to contact said shaft threads at said reference position.

17. A fastening apparatus as claimed in claim 16 wherein said housing has a sidewall defining said chamber, which sidewall has at least one angular surface generally parallel to said mandrel longitudinal axis;

said mandrel base having at least one base angular surface;

said base angular surface and sidewall angular surface juxtaposed to prevent rotation of said mandrel in said housing.

18. A fastening apparatus as claimed in claim 12 wherein said locking means is a one-way nut.

19. A fastening apparatus as claimed in claim 14 wherein said housing has a flange at said open end extending radially outward from said mandrel longitudinal axis, and further comprising at least one sill extending from said flange and operable to contact said end cap lugs to limit the rotation of said end cap.

20. A fastening apparatus as claimed in claim 19 further comprising said housing having a first sill and a second sill extending from said flange and diametrically positioned at the perimeter of said flange to limit the rotation of said end cap; said end cap lugs engaging said flange to secure said end cap to said housing for rotation on said flange between said sills.

21. A fastening apparatus as claimed in claim 8 comprising a support washer with a perimeter, at least one notch at said perimeter, a port, and a central passage for said shaft;

said locking means is an annular one-way nut having a central slot with said spindle shaft extending therethrough and a perimeter, at least one tab angularly extending into said central port, and a nut opening, and at least one notch at said nut perimeter;

said end cap projection matable with said nut notch for rotating of said nut with said end cap.

22. A fastening apparatus as claimed in claim 21 wherein said base has an upper pedestal with said shaft extending therefrom, said upper pedestal having at least one angular face;

said end cap defining a blindhole bore alignable with said locking means opening at said reference position;

said bias means is a coil spring with a lower formed end and an upper arm, said lower formed end contacting said upper pedestal at said angular face to inhibit rotation of said coil spring, and said upper arm insertable in said nut opening, said washer port and said end cap blindhole bore to bias said end cap, washer and nut to said reference position.

* * * * *

UNITED STATES PATENT AND TRADEMARK OFFICE

CERTIFICATE OF CORRECTION

PATENT NO. : 5,048,805

DATED : September 17, 1991

INVENTOR(S) : Wiseman, Michael D.

It is certified that error appears in the above-identified patent and that said Letters Patent is hereby corrected as shown below:

In column 2, line 29, change "drawing," to --drawings,--.

In column 5, line 33, change "notches" to --lugs--.

In column 5, lines 33-34, after "166 of" delete second occurrence "of".

In column 5, line 62, change "cushion 180" to --bushing 180--.

in column 5, line 65, change "Cushion 180" to --Bushing 180--.

In column 5, line 63 . change "Workpiece" to --workpiece--.

UNITED STATES PATENT AND TRADEMARK OFFICE

CERTIFICATE OF CORRECTION

PATENT NO. : 5,048,805

DATED : September 17, 1991

INVENTOR(S) : Wiseman, Michael D.

It is certified that error appears in the above-identified patent and that said Letters Patent is hereby corrected as shown below:

IN THE CLAIMS:

In column 7, line 35, insert --, said nut-- after "one-way nut".

In column 8, line 52, insert --washer notch, and having at least one angularly displaced-- after "said support".

Signed and Sealed this

Thirtieth Day of March, 1993

*Attest:*

STEPHEN G. KUNIN

*Attesting Officer*

*Acting Commissioner of Patents and Trademarks*